US009838815B1

(12) United States Patent
Zhang et al.

(10) Patent No.: US 9,838,815 B1
(45) Date of Patent: Dec. 5, 2017

(54) SUPPRESSING OR REDUCING EFFECTS OF WIND TURBULENCE

(71) Applicant: QUALCOMM Incorporated, San Diego, CA (US)

(72) Inventors: Shuhua Zhang, San Diego, CA (US); Erik Visser, San Diego, CA (US); Lae-Hoon Kim, San Diego, CA (US); Raghuveer Peri, San Diego, CA (US); Yinyi Guo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/170,771

(22) Filed: Jun. 1, 2016

(51) Int. Cl.

| | |
|---|---|
| ***H04B 15/00*** | (2006.01) |
| ***H04R 29/00*** | (2006.01) |
| ***H04R 3/00*** | (2006.01) |

(52) U.S. Cl.
CPC ........... *H04R 29/008* (2013.01); *H04R 3/005* (2013.01); *H04R 29/004* (2013.01); *H04R 2410/07* (2013.01)

(58) Field of Classification Search
CPC .... H04R 3/005; H04R 29/004; H04R 29/008; H04R 2410/07
USPC ..... 381/71.1–71.14, 73.1, 94.1–94.9; 700/94
See application file for complete search history.

(56) References Cited

U.S. PATENT DOCUMENTS 8,983,833 B2 * 3/2015 Joshi .................. G10L 21/0208 381/73.1
2004/0165736 A1 * 8/2004 Hetherington ...... G10L 21/0208 381/94.3
2004/0167777 A1 * 8/2004 Hetherington ...... G10L 21/0208 704/226

(Continued)

FOREIGN PATENT DOCUMENTS

WO 2013091021 A1 6/2013
WO 2015003220 A1 1/2015

(Continued)

OTHER PUBLICATIONS

Freels K., et al., "New Wireless, Binaural Processing Reduces Problems Associated with Wind Noise in Hearing Aids", Audiology Online, Article 15453, Oct. 12, 2015, XP055333294, Retrieved from the Internet: URL:http://web.archive.org/web/20151127201735/http://www.audiologyonline.com/articles/new-wireless-binaural-processing-reduces-15453 [retrieved on Jan. 9, 2017], 8 pages.

(Continued)

*Primary Examiner* — Hemant Patel
(74) *Attorney, Agent, or Firm* — Toler Law Group, PC

(57) ABSTRACT

A method of operation of a device includes receiving an input signal at the device. The input signal is generated using at least one microphone. The input signal includes a first signal component having a first amount of wind turbulence noise and a second signal component having a second amount of wind turbulence noise that is greater than the first amount of wind turbulence noise. The method further (Continued)

includes generating, based on the input signal, an output signal at the device. The output signal includes the first signal component and a third signal component that replaces the second signal component. A first frequency response of the input signal corresponds to a second frequency response of the output signal.

30 Claims, 4 Drawing Sheets

(56) References Cited

U.S. PATENT DOCUMENTS

| | | | | |
|---|---|---|---|---|
| 2007/0058822 | A1* | 3/2007 | Ozawa ................ | G10L 21/0208 381/94.1 |
| 2008/0317261 | A1 | 12/2008 | Yoshida et al. | |
| 2012/0123771 | A1 | 5/2012 | Chen et al. | |

FOREIGN PATENT DOCUMENTS

| | | | |
|---|---|---|---|
| WO | 2015179914 | A1 | 12/2015 |
| WO | 2015184499 | A1 | 12/2015 |

OTHER PUBLICATIONS

International Search Report and Written Opinion—PCT/US2017/026526—ISA/EPO—dated Jun. 26, 2017.

* cited by examiner

SUPPRESSING OR REDUCING EFFECTS OF WIND TURBULENCE

I. FIELD

The present disclosure is generally related to electronic devices and more particularly to reducing effects of wind turbulence noise signals at electronic devices.

II. DESCRIPTION OF RELATED ART

Wind may affect quality of recorded audio. For example, an "action camera" may be used to record video and audio in connection with activities such as hiking, biking, motorcycling, and surfing, and recorded audio in these cases may be susceptible to noise caused by wind.

Certain electronic devices attempt to reduce noise caused by wind using a filter, such as a high-pass filter that reduces signal frequencies associated with wind. Such a technique may degrade signal quality by attenuating certain signal components (e.g., signal components associated with speech or music). Further, a wind "spike" that occurs rapidly (and that has high frequency signal components) may not be reduced by a high-pass filter in some cases.

Other electronic devices may reduce noise due to wind using a physical device, such as a wind screen or a wind shield. Use of a physical device to reduce wind noise may reduce signal fidelity and may be infeasible in some recording applications. For example, use of a wind screen or a wind shield to remove signal components associated with wind noise may also reduce or eliminate signal components associated with a signal of interest (e.g., speech of music) in some cases.

III. SUMMARY

A device may identify an input signal having a signal component associated with wind turbulence and may selectively attenuate or suppress the signal component (e.g., instead of "globally blocking" signal components using a wind shield or a high-pass filter) to generate an output signal. For example, a signal component having a low amount of wind turbulence noise may be "extended" to modify or replace a signal component having a higher amount of wind turbulence noise (e.g., using an interpolation technique). As another example, multi-channel processing may be performed using signals in a multi-microphone device to reduce a wind turbulence effect. A frequency response and a spatial image of the output signal may correspond to (e.g., may be the same as) a frequency response and a spatial image of the input signal, resulting in improved audio fidelity. The second signal component may include wind turbulence noise that is "annoying" to a listener (e.g., wind turbulence noise that causes a "popping" sound due to wind striking a microphone diaphragm), and one or more other signal features (e.g., a signal of interest, such as music or speech) may be unchanged or substantially unchanged (e.g., in order to retain signal fidelity) after reducing the second signal component.

In an illustrative example, a method of operation of a device includes generating an input signal at the device. The input signal is generated using at least one microphone. The input signal includes a first signal component having a first amount of wind turbulence noise and a second signal component having a second amount of wind turbulence noise that is greater than the first amount of wind turbulence noise. The method further includes generating, based on the input signal, an output signal at the device. The output signal includes the first signal component and a third signal component that replaces the second signal component.

In another illustrative example, a device includes a wind turbulence noise reduction engine configured to receive an input signal including a first signal component having a first amount of wind turbulence noise and a second signal component having a second amount of wind turbulence noise that is greater than the first amount of wind turbulence noise. The device is further configured to generate an output signal based on the input signal. The output signal includes the first signal component and a third signal component that replaces the second signal component. The third signal component may be generated using an interpolation technique or using a multi-channel processing technique, as illustrative examples. The frequency response of the input signal corresponds to the frequency response of the output signal. The apparatus further includes a memory coupled to the wind turbulence noise reduction engine.

In another illustrative example, a computer-readable medium stores instructions executable by a processor to perform operations. The operations include receiving an input signal corresponding to at least one microphone of a device. The input signal includes a first signal component having a first amount of wind turbulence noise and a second signal component having a second amount of wind turbulence noise that is greater than the first amount of wind turbulence noise. The operations further include generating, based on the input signal, an output signal that includes the first signal component and a third signal component that replaces the second signal component. The third signal component may be generated using an interpolation technique or using a multi-channel processing technique, as illustrative examples. The frequency response of the input signal corresponds to the frequency response of the output signal.

In another illustrative example, an apparatus includes means for receiving an input signal and for generating an output signal based on the input signal. The input signal includes a first signal component having a first amount of wind turbulence noise and a second signal component having a second amount of wind turbulence noise that is greater than the first amount of wind turbulence noise. The output signal includes the first signal component and a third signal component that replaces the second signal component. The third signal component may be generated using an interpolation technique or using a multi-channel processing technique, as illustrative examples. The frequency response of the input signal corresponds to the frequency response of the output signal. The apparatus further includes means for storing reference data available to the means for receiving the input signal.

One particular advantage provided by at least one of the disclosed examples is improved fidelity of signals while also enabling reduction of wind turbulence noise. For example, a signal of interest (e.g., an acoustic signal, such as speech or music) may be preserved or unchanged, and an "annoying" portion (e.g., non-acoustic signal component, such as wind turbulence noise that is perceivable by a listener) may be replaced with another signal component. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
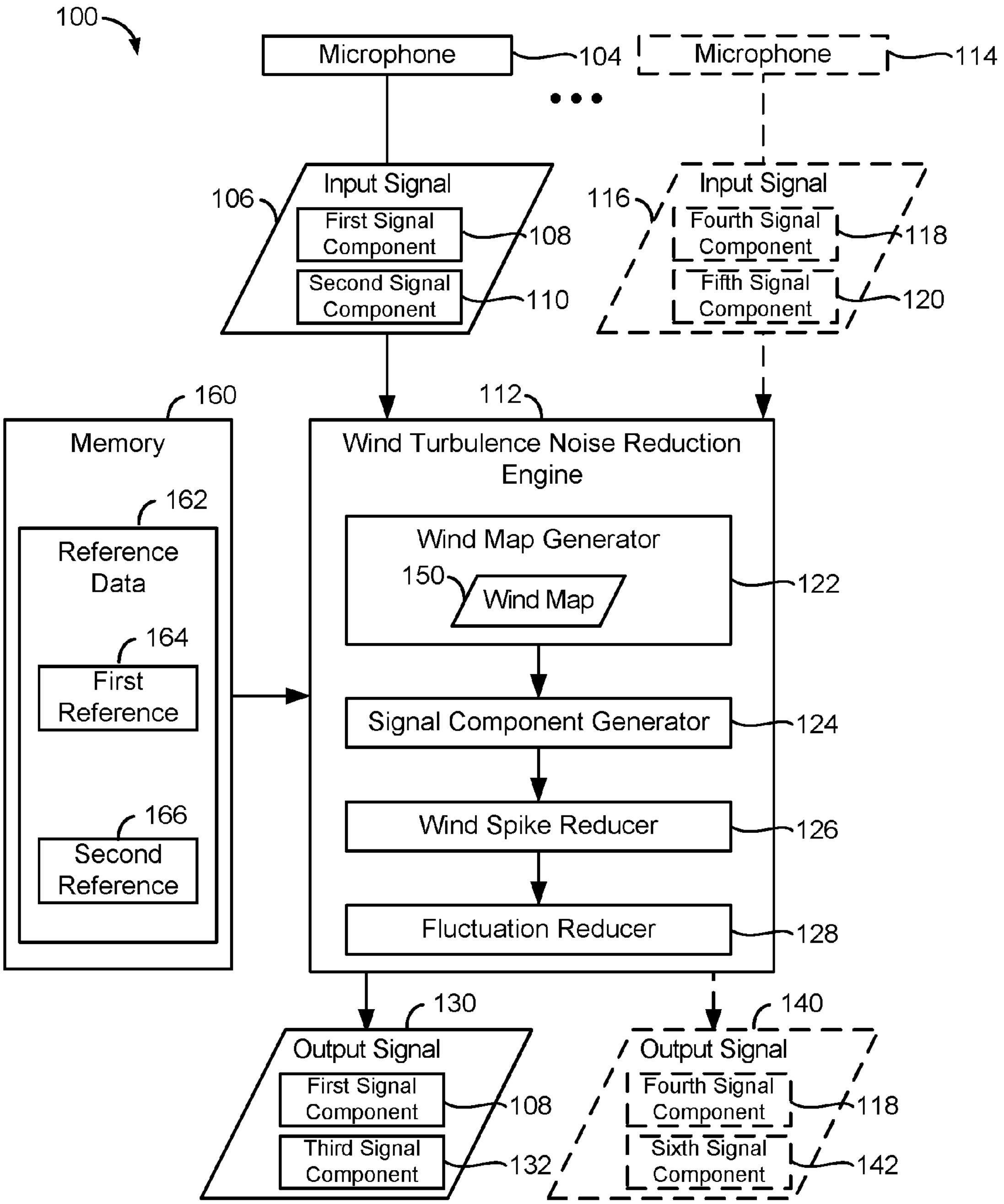
FIG. 1 is a block diagram of an illustrative example of a device that includes a wind turbulence noise reduction engine.

Referring to FIG. 1, an illustrative example of a device is depicted and generally designated 100. The device 100 may be included in an action camera, a drone camera, a surveillance device, a mobile device, or another electronic device, as illustrative examples.

The device 100 may include one or more microphones, such as a microphone 104. In a multi-microphone implementation, the device 100 may include one or more other microphones, such as a second microphone 114.

The device 100 includes a wind turbulence noise reduction engine 112. The wind turbulence noise reduction engine 112 may be coupled to one or more microphones, such as the microphones 104, 114. The wind turbulence noise reduction engine 112 may include a wind map generator 122 and a signal component generator 124 coupled to the wind map generator 122. The wind turbulence noise reduction engine 112 may also include a wind spike reducer 126 coupled to the signal component generator 124 and a fluctuation reducer 128 coupled to the wind spike reducer 126.

The device 100 may include a memory 160 coupled to the wind turbulence noise reduction engine 112. The memory 160 may store reference data 162.

During operation, the microphone 104 may generate an input signal 106 based on sound at the device 100. The input signal 106 may include a first signal component 108 having a first amount of wind turbulence noise and a second signal component 110 having a second amount of wind turbulence noise that is greater than the first amount of wind turbulence noise. To illustrate, the first signal component 108 may include a signal of interest, such as music or speech, and the second signal component 110 may include a non-acoustic signal, such as wind turbulence noise.

For clarity, certain examples are described with reference to the input signal 106. It should be appreciated that such examples may also be applicable to one or more other signals alternatively or in addition to the input signal 106, such as one or more signals generated in connection with a multi-microphone implementation. To further illustrate, in a multi-microphone implementation, the second microphone 114 may generate a second input signal 116 based on sound at the device 100. The wind turbulence noise reduction engine 112 may receive the second input signal 116 from the second microphone 114. The second input signal 116 may include a fourth signal component 118 having a first amount of wind turbulence noise and a fifth signal component 120 having a second amount of wind turbulence noise that is greater than the first amount of wind turbulence noise. To illustrate, the fourth signal component 118 may include a signal of interest, such as music or speech, and the fifth signal component 120 may include a non-acoustic signal, such as wind turbulence noise.

The wind turbulence noise reduction engine 112 may receive the input signal 106 from the microphone 104. The wind map generator 122 may generate a wind map 150 based on the input signal 106. The wind map 150 may indicate, for each frequency of a plurality of frequencies of the input signal and for each time interval of a plurality of time intervals, a ratio of wind turbulence energy to signal energy of the input signal 106.

In an illustrative example, the wind map generator 122 is configured to identify wind turbulence noise of the input signal 106 and to generate the wind map 150 based on the wind turbulence noise. To illustrate, the wind map generator 122 may access reference data 162 (e.g., a wind turbulence signature) from the memory 160 and may compare the reference data 162 to samples of the input signal 106 to identify wind turbulence noise for a time domain representation of the input signal 106, for a frequency domain representation of the input signal 106, or both. In some implementations, the wind map generator 122 may include a comparator circuit configured to compare samples of the input signal 106 to the reference data 162.

In some implementations, the wind map generator 122 is configured to use a multi-resolution technique to detect wind turbulence noise of the input signal 106. For example, the wind map generator 122 may compare a first sample of the samples of the input signal 106 to a first reference 164 of the reference data 162. The first sample and the first reference 164 may have a first duration, such as a first number of milliseconds. The wind map generator 122 may compare a second sample of the samples of the input signal 106 to a second reference 166 of the reference data 162. The second sample and the second reference 166 may have a second duration different than the first duration, such as a second number of milliseconds. Use of a multi-resolution technique may improve accuracy of wind turbulence noise detection by enabling detection of different durations of wind turbulence noise (e.g., wind turbulence noise of long durations and short durations).

In a multi-microphone implementation, the wind map generator 122 may further identify an amount of wind turbulence for each of multiple signals (e.g., the input signals 106, 116). Further, in a multi-microphone implementation, identifying the wind turbulence noise may include determining that a difference between the input signal 106 and the second input signal 116 satisfies a threshold (e.g., is greater than the threshold or is greater than or equal to the threshold). As an illustrative example, if a cross-correlation between the input signals 106, 116 fails to satisfy a threshold (e.g., is less than the threshold or is less than or equal to the threshold) for a particular time interval, then one of the input signals 106, 116 may be subject to wind turbulence noise during the particular time interval.

The wind turbulence noise reduction engine 112 may identify that the second signal component 110 is associated with wind turbulence noise (e.g., based on the wind map 150). In a multi-microphone implementation, the second input signal 116 may include a fourth signal component 118 and a fifth signal component 120 having a greater amount of wind turbulence noise than the fourth signal component 118. The wind turbulence noise reduction engine 112 may identify the fifth signal component 120 as being subject to wind turbulence noise.

In response to identifying the second signal component 110, the signal component generator 124 may generate a third signal component 132 (e.g., in connection with a wind turbulence suppression process). For example, the signal component generator 124 may synthesize the third signal component 132 to replace the second signal component 110, such as by "extending" the first signal component 108 to create the third signal component 132. To further illustrate, synthesizing the third signal component 132 may include temporally interpolating portions of the input signal 106 to generate the third signal component 132 after removing the second signal component 110. As another example, in a multi-microphone implementation, the third signal component 132 may be generated based on the second input signal 116, such as using a cross-channel filtering technique (e.g., by adjusting an inter-channel phase difference between the input signal 106 and the second input signal 116 to generate the third signal component 132).

The third signal component 132 may correspond to an attenuated version of the second signal component 110. The third signal component 132 may correspond to a signal of interest, such as a speech signal. In some examples, the third signal component 132 may be "covered" or obscured by the second signal component 110 in the input signal 106 (e.g., the third signal component 132 may be inaudible if the input signal 106 or a representation of the input signal 106 is provided to a speaker). Attenuating or removing the second signal component 110 may "restore" the third signal component 132 (e.g., so the third signal component 132 is audible if the output signal 130 or a representation of the output signal 130 is provided to a speaker).

Alternatively or in addition, in response to identifying the fifth signal component 120, the signal component generator 124 may synthesize a sixth signal component 142 to replace the fifth signal component 120, such as by "extending" the fourth signal component 118 to create the sixth signal component 142. For example, synthesizing the sixth signal component 142 may include temporally interpolating portions of the second input signal 116 after removing the fifth signal component 120 to generate the sixth signal component 142. As another example, the sixth signal component 142 may be generated based on the first input signal 106, such as using a cross-channel filtering technique (e.g., by adjusting an inter-channel phase difference between the input signal 106 and the second input signal 116 to generate the sixth signal component 142). The sixth signal component 142 may correspond to an attenuated version of the fifth signal component 120.

The wind turbulence noise reduction engine 112 may be configured to reduce wind spikes in the input signal 106. For example, the wind spike reducer 126 may be configured to identify one or more wind spike artifacts in the input signal 106 and to attenuate the one or more wind spike artifacts. To illustrate, the second signal component 110 may correspond to a wind spike, and the wind spike reducer 126 may be configured to attenuate the wind spike.

The fluctuation reducer 128 may suppress one or more fluctuations in the input signal 106 (e.g., by "smoothing" wind-induced amplitude variations). To illustrate, the second signal component 110 may correspond to a wind fluctuation, and the fluctuation reducer 128 may be configured to attenuate the wind fluctuation. The fluctuation reducer 128 may generate an output signal 130 that includes the signal components 108, 132. The fluctuation reducer 128 may suppress or attenuate one or more fluctuations in the second input signal 116 and may generate a second output signal 140 that includes the signal components 118, 142.

A first frequency response of the input signal 106 may correspond to a second frequency response of the output signal 130. Alternatively or in addition, a third frequency response of the second input signal 116 may correspond to a fourth frequency response of the second output signal 140. As used herein, a "frequency response" of a signal may refer to an average value (e.g., magnitude) of a frequency spectrum (e.g., a discrete Fourier transform (DFT) of the signal over a particular range (e.g., over a long-term frequency range).

The input signal 106 and the second input signal 116 may have a first spatial image, and the output signal 130 and the second output signal 140 may have a second spatial image corresponding to the first spatial image. To illustrate, a first phase difference between the input signal 106 and the second input signal 116 may correspond to a second phase difference between the output signal 130 and the second output signal 140. Alternatively or in addition, a first gain difference between the input signal 106 and the second input signal 116 may correspond to a second gain difference between the output signal 130 and the second output signal 140.

One or more aspects of FIG. 1 may enable effective reduction or suppression of wind turbulence noise. Effective reduction or suppression of wind turbulence noise may improve quality and intelligibility of captured audio.

Figure 2:
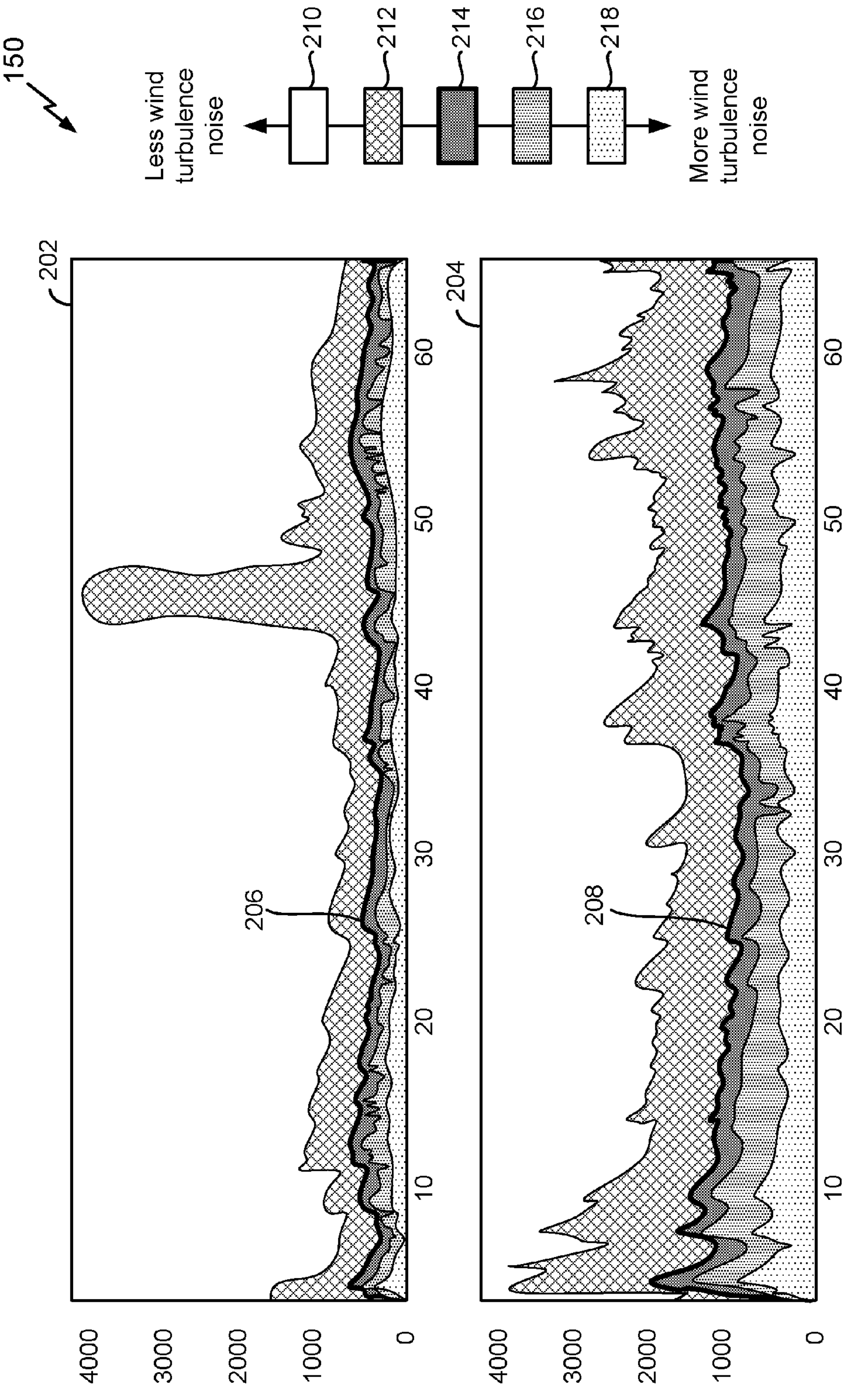
FIG. 2 is a diagram of an illustrative example of a wind map that may be generated by the wind turbulence noise reduction engine of FIG. 1.

FIG. 2 illustrates an illustrative example of the wind map 150. In FIG. 2, each abscissa may indicate time (e.g., in units of seconds (s)), and each ordinate may indicate frequency (e.g., in units of hertz (Hz)).

The wind map 150 may include one or spectrograms. For example, the wind map 150 may include a first spectrogram 202 and a second spectrogram 204. In an illustrative example, the first spectrogram 202 corresponds to the input signal 106 of FIG. 1, and the second spectrogram 204 corresponds to the second input signal 116 of FIG. 1.

Each of the spectrograms 202, 204 may correspond to a respective matrix, and each value of a matrix may indicate an amount of wind turbulence noise associated with a signal. In an illustrative example, each value of a matrix may correspond to a ratio of wind turbulence energy of a signal to signal energy (or "total" energy) of the signal. To further illustrate, the example of FIG. 2 illustrates five illustrative values (i.e., values 210, 212, 214, 216, and 218) that may correspond to different ratios of wind turbulence energy to signal energy. It should be appreciated that the example of FIG. 2 is illustrative and that in other examples the wind map 150 may include more than or fewer than five values.

One or more switching frequencies may be determined based on the wind map 150. To illustrate, the first spectrogram 202 may indicate a first set of switching frequencies 206 (illustrated as a solid black line), and the second spectrogram may indicate a second set of switching frequencies 208 (also illustrated as a solid black line). A switching frequency may correspond to a highest frequency at which a ratio of wind turbulence energy to signal energy satisfies (e.g., is greater than, or is greater than or equal to) to a threshold. The wind turbulence noise reduction engine 112 of FIG. 1 may be configured to select signal components of a signal based on the sets of switching frequencies 206, 208. As an illustrative example, the wind turbulence noise reduction engine 112 may select a "less windy" portion of a signal to replace another portion of the signal based on the sets of switching frequencies 206, 208. Alternatively or in addition, the wind turbulence noise reduction engine 112 may select a "less windy" portion of a signal to replace a portion of another signal based on the sets of switching frequencies 206, 208.

One or more aspects described with reference to FIG. 2 may enable improved signal fidelity at an electronic device. For example, by performing wind turbulence noise reduction based on the wind map 150, quality and intelligibility of captured audio may be improved.

Figure 3:
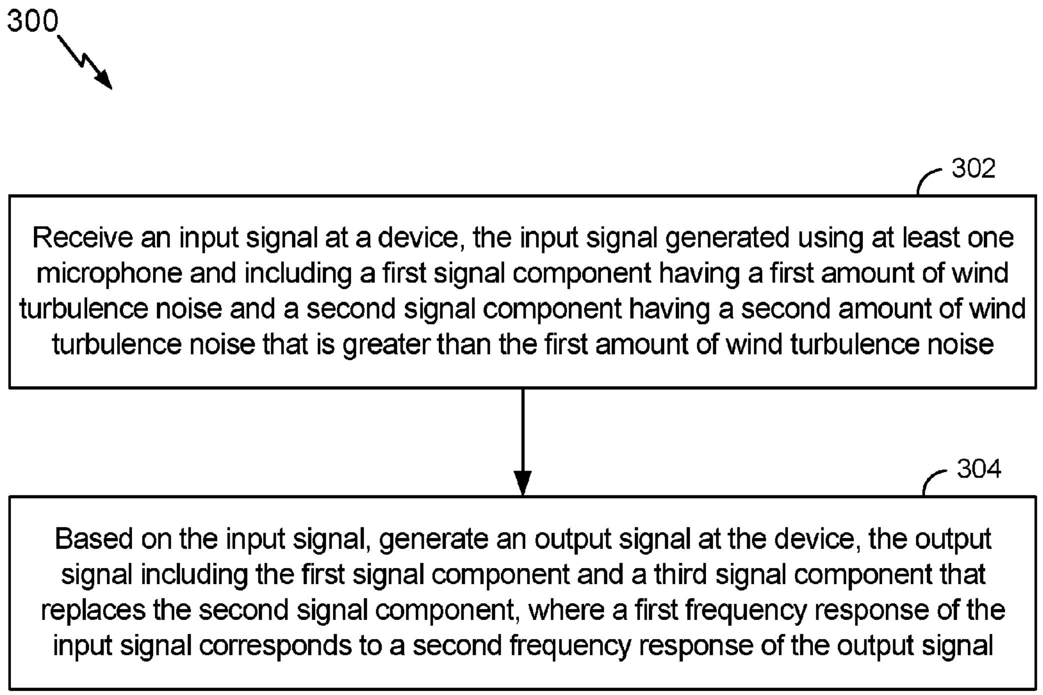
FIG. 3 is a flow diagram of an illustrative example of a method of operation of a device, such as the device of FIG. 1.

FIG. 3 illustrates a flow chart of a method 300 of operation of a device. For example, the method 300 may be performed by the device 100 of FIG. 1 (e.g., by the wind turbulence noise reduction engine 112).

The method 300 includes receiving an input signal at a device, at 302. The input signal (e.g., the input signal 106 of FIG. 1) is generated using at least one microphone (e.g., the microphone 104). The input signal includes a first signal component (e.g., the first signal component 108 of FIG. 1) having a first amount of wind turbulence noise and a second signal component (e.g., the second signal component 110 of FIG. 1) having a second amount of wind turbulence noise that is greater than the first amount of wind turbulence noise.

The method 300 further includes generating, based on the input signal, an output signal at the device, at 304. The output signal (e.g., the output signal 130) includes the first signal component and a third signal component (e.g., the third signal component 132) that replaces the second signal component. A first frequency response of the input signal corresponds to a second frequency response of the output signal.

In an illustrative implementation, the wind turbulence noise reduction engine 112 of FIG. 1 is integrated within an action camera device, such as an action camera for use in hiking, biking, motorcycling, racing, sky diving, or surfing, as illustrative examples. In another illustrative implementation, the wind turbulence noise reduction engine 112 of FIG. 1 is integrated within an autonomous vehicle, such as a drone or a self-driving car. In another illustrative implementation, the wind turbulence noise reduction engine 112 of FIG. 1 is integrated within a surveillance camera.

The wind turbulence noise reduction engine 112 of FIG. 1 may be configured to selectively suppress an "annoying" portion of wind turbulence noise, such as wind-induced spectral spikes of the input signal 106 and low-to-mid frequency fluctuations of the input signal 106. The wind turbulence noise reduction engine 112 may be configured to suppress "annoying" portions of wind turbulence noise of the input signal 106 without removing an entirety of the wind turbulence noise, which may enable the output signal 130 to have a same or similar frequency response (also referred to herein as frequency response) as the input signal 106.

The wind turbulence noise reduction engine 112 may be configured to reduce wind turbulence noise while also preserving spatial diversity of signals (e.g., in a low-wind environment). In some implementations, the wind turbulence noise reduction engine 112 is configured to resynthesize a spatial image of the output signals 130, 140 in response to detecting that the spatial image of the output signals 130, 140 differs from a spatial image of the input signals 106, 116 by more than a threshold amount (e.g., in response to "damage" to the spatial image of the input signals 106, 116 due to wind turbulence noise).

The wind turbulence noise reduction engine 112 may be configured to generate a wind map (e.g., the wind map 150) characterizing a ratio of wind noise energy of the input signal 106 to total energy of the input signal 106 across time, frequency, and microphones. The wind map 150 may be feature-based and cross-correlation based.

The wind turbulence noise reduction engine 112 may be configured to analyze spatial images from low wind time-frequency regions of the input signal 106. The wind turbulence noise reduction engine 112 may be configured to use temporal interpolation and to synthesize inter-channel phase differences between the input signals 106, 116 in high wind time-frequency regions of the input signals 106, 116. Alternatively or in addition, the wind turbulence noise reduction engine 112 may be configured to use multi-resolution analysis to locate wind spikes across all affected bands and to suppress wind spikes using cross-channel filtering, phase re-synthesis, attenuation, adjacent sample replacement, one or more other techniques, or a combination thereof. Alternatively or in addition, the wind turbulence noise reduction engine 112 may be configured to suppress fluctuations of the input signal 106 by smoothing wind-induced level variations that cause a listener to perceive a "popping" sound and non-stationarity in low-to-mid frequencies while also maintaining the same (or similar) frequency response as the input signal 106.

The wind turbulence noise reduction engine 112 may be configured to compare a frequency response of the input signal 106 with a frequency response of the output signal 130 (e.g., in response to detecting wind noise in the input signal 106). The wind turbulence noise reduction engine 112 may be configured to modify (e.g., resynthesize) the frequency response of the output signal 130 in response to detecting that a difference between the frequency response of the input signal 106 and the frequency response of the output signal 130 satisfies a threshold. In a particular example, the wind turbulence noise reduction engine 112 is configured to adjust a particular range of the frequency response of the output signal 130 in response to detecting that a difference between the particular range and a corresponding range of the frequency response of the input signal 106 satisfies a threshold. The particular frequency range may correspond to a band of frequencies having absolute values of less than 500 hertz, as an illustrative example.

The wind turbulence noise reduction engine 112 may be configured to reduce or eliminate (e.g., in a high-wind environment) wind saturations, spikes (e.g., random or pseudo-random vertical spectral lines), and fluctuations (e.g., random power variations at low band, such as less than 800 hertz) of the input signal 106. For example, an envelope of the output signal 130 (e.g., a time domain representation of the envelope of the output signal 130) may exclude wind saturations and wind spikes that may be present in the input signal 106. In some examples, the third signal component 132 may be "covered" (e.g., may be inaudible) in the input signal 106 by the second signal component 110, and the wind turbulence noise reduction engine 112 may "recover" the third signal component 132 using one or more operations described herein. In some cases, during strong wind turbulence, the wind turbulence noise reduction engine 112 may preserve a spatial image of the input signals 106, 116 (e.g., so that a spatial image of the output signals 130, 140 corresponds to a spatial image of the input signals 106, 116) irrespective of an orientation of an electronic device that includes the wind turbulence noise reduction engine 112 relative to a direction of the wind turbulence.

To further illustrate certain illustrative aspects of the disclosure, an illustrative example of a first wind noise suppression process in a single-microphone implementation may be performed by the wind turbulence noise reduction engine 112. The first wind noise suppression process may include receiving a monaural (mono) input (e.g., the input signal 106) from a microphone, such as the microphone 104.

The first wind noise suppression process may further include performing feature extraction of the mono input to identify one or more features (e.g., signal components, such as any of the signal components 108, 110, and 132) of the mono input. The feature extraction may be performed based on one or more of a frequency centroid of the mono input, a sub-band level of the mono input, a short time level of the mono input, or a short time variance of the mono input.

The first wind noise suppression process may further include performing a wind detection operation, such as using a linear classification operation. In an illustrative example, the signal component generator 124 performs the wind detection operation to detect the second signal component 110 (e.g., using the reference data 162).

The first wind noise suppression process may further include performing a low-band wind reduction operation. For example, the signal component generator 124 may perform the low-band wind reduction operation to reduce or eliminate the second signal component 110. The low-band wind reduction operation may be performed using one or more of an adaptive high-pass filtering or a k-means singular value decomposition (KSVD), as illustrative examples.

The first wind noise suppression process may further include performing a wind spike detection operation. For example, the wind spike reducer 126 may perform the wind spike detection operation. The wind spike detection operation may be performed using a multi-resolution technique (e.g., by analyzing portions of the input signal 106 having different resolutions, such as different time durations). The multi-resolution technique may include a multi-resolution high-band level variation analysis of the input signal 106.

The first wind noise suppression process may further include performing a wind spike smoothing operation. For example, the wind spike reducer 126 may perform the wind spike smoothing operation. The wind spike smoothing operation may include one or more of attenuating or reducing at least a portion of the second signal component 110, performing sample level smoothing to smooth the second signal component 110, or performing an adjacent replacement to replace the second signal component 110 (e.g., with the third signal component 132), as illustrative examples.

The first wind noise suppression process may further include performing a wind fluctuation suppression operation. For example, the fluctuation reducer 128 may perform the wind fluctuation suppression operation. The wind fluctuation suppression operation may include suppressing or reducing random (or pseudo-random) power modulations in the input signal 106 due to wind turbulence. The first wind noise suppression process may further include generating a mono output (e.g., the output signal 130).

An illustrative example of a second wind noise suppression process may be performed by the wind turbulence noise reduction engine 112 in a multi-microphone implementation. The second wind noise suppression process may include receiving a multichannel input (e.g., the input signals 106, 116) from multiple microphones, such as the microphones 104, 114.

The second wind noise suppression process may further include determining a degree of similarly between signals of the multichannel input, such as by performing a cross-channel correlation analysis. For example, the wind turbulence noise reduction engine 112 may perform the cross-channel correlation analysis by determining one or more of a cross-correlation between the input signals 106, 116 or a chi-square distribution associated with the input signals 106, 116. The cross-channel correlation analysis may be performed for a particular frequency range of the multichannel input, such as in a low-band frequency range of the multichannel input.

The second wind noise suppression process may further include performing a wind intensity analysis. For example, the wind turbulence noise reduction engine 112 may determine "absolute" wind intensity of the multichannel input, such as by determining, for each signal of the multichannel input, an amount of energy that is uncorrelated with each other signal of the multichannel input. If the amount of energy satisfies a threshold, the signal may be subject to wind turbulence noise. Alternatively or in addition, the wind turbulence noise reduction engine 112 may determine relative wind intensity of the multichannel input, such as by determining, for each signal of the multichannel input, a ratio of an amount of energy that is uncorrelated with each other signal of the multichannel input to an amount of energy that is correlated with each other signal of the multichannel input.

The second wind noise suppression process may optionally include performing a replacement operation. For example, the wind turbulence noise reduction engine 112 may replace a particular portion of a signal (e.g., one or both of the signal components 110, 120) with another portion of a signal (e.g., one or both of the signal components 132, 142). As an illustrative example, the particular portion may correspond to a channel or a frequency band that is subject to wind turbulence noise, and the other portion may correspond to one or more of another frequency band or another channel that is subject to less wind turbulence noise. In some implementations, if a particular channel is significantly "less windy" than other channels of the multichannel input, one or more signal components of the particular channel may replace one or more portions of other channels of the multichannel input. The replacement operation may include replacing the second signal component 110 with a signal component (e.g., the fourth signal component 118) of the second input signal 116, replacing the fifth signal component 120 with a signal component (e.g., the first signal component 108) of the input signal 106, or both. In some implementations, the replacement operation is performed in response to a determination that one or more signals are subject to a large amount of wind turbulence noise, in response to a determination that one or more signals are subject to a small amount of wind turbulence noise (or no wind turbulence noise), or both.

If the replacement operation is performed, the second wind noise suppression process may further include performing a cross-channel filtering operation. For example, a gain of a signal of the multichannel input may be adjusted based on a "less windy" signal of the multichannel input, such as by modifying a gain of the second signal component 110 based on the second input signal 116 to generate the third signal component 132, by modifying a gain of the fifth signal component 120 based on the input signal 106 to generate the sixth signal component 142, or both. The cross-channel filtering operation may be performed based on a target channel spectral magnitude (e.g., a magnitude of a frequency spectrum of a "least windy" signal of the multichannel input). The cross-channel filtering operation may be performed to preserve phase spectra of the multichannel input. The cross-channel filtering operation may include level adjustment of the multichannel input.

If the replacement operation is not performed, the second wind noise suppression process may further include performing a low-band wind reduction operation (e.g., alternatively to performing the cross-channel filtering operation). The low-band wind reduction operation may correspond to the low-band wind reduction operation described with reference to the first wind noise suppression process.

After performing the replacement operation or the low-band wind reduction operation, the second wind noise suppression process may further include performing a wind spike detection operation, a wind spike smoothing operation, a fluctuation suppression operation, one or more other operations, or a combination hereof. To illustrate, the wind spike detection operation, the wind spike smoothing operation, and the fluctuation suppression operation may be as described with reference to the first wind noise suppression process. In an illustrative example, the wind spike smoothing operation may include replacing a signal (or a portion of a signal) subject to one or more wind spikes with a signal (or a portion of a signal) that is subject to fewer wind spikes (or no wind spikes). The second wind noise suppression process may further include generating either a mono output (e.g., either the output signal 130 or the second output signal 140) or a multichannel output (e.g., both of the output signals 130, 140).

The wind turbulence noise reduction engine 112 may be configured to selectively reduce or suppress wind turbulence noise (also referred to herein as wind turbulence artifacts) in a signal, such as one or both of the input signals 106, 116. The wind turbulence artifacts may be reduced or suppressed without modification of one or more other signal components. As used herein, a wind turbulence artifact may correspond to an "annoying" portion of a signal that is perceivable by a listener upon acoustic reproduction of the signal (e.g., using a speaker), such as a "popping" noise caused wind turbulence at a microphone that generates the signal, as an illustrative example. A wind turbulence artifact may be associated with a high amount of energy in a lower frequency band, such as 0-500 hertz (Hz), and may block perception of low frequency acoustic signals, such as speech signals, music signals, or both. A wind turbulence artifact may include one or more transient wideband spectral spikes due to short duration and strong local turbulences at a membrane of a microphone. In some cases, a wind turbulence artifact may correspond to one or more fluctuations of a total level (e.g., acoustic and turbulence) prominent at frequencies lower than 1000 Hz, such as if wind turbulence is relatively random.

To further illustrate, certain wind turbulence reduction processes are described with reference to a multichannel implementation. The wind turbulence noise reduction engine 112 of FIG. 1 may perform one or more of the wind turbulence reduction processes (alternatively or in addition to one or more other processes or operations described herein).

In a first wind turbulence reduction process, a wind map (e.g., the wind map 150) may be generated across time and frequencies associated with a multichannel input, such as the input signals 106, 116. The wind map may include a two-dimensional (2D) matrix for each channel of the multichannel input. Each 2D matrix may indicate a ratio of wind energy to signal energy for each time-frequency "bin" of a spectrogram of the channel. A spectrogram of each channel of the multichannel input may be used to generate the wind map.

During the first wind turbulence reduction process, cross-correlations may be determined for each pair of channels based on frequency spectra within a common time frame. The cross-correlations may be determined for all bins (frequencies) within a pre-determined frequency band (e.g., 0-4000 Hz). The cross-correlations may include a real part of a conjugate product of spectral coefficients. The bin-by-bin cross-correlations may be further smoothed over time frames (e.g., using auto-regressive filtering along the time-axis at each bin within the band). For each channel, bin-by-bin auto-correlations within the band and smoothed versions corresponding to the auto-correlations may be determined.

For each channel pair, smoothed bin-by-bin cross-correlations may be cumulated from a highest bin in a band to a lowest bin in the band (e.g., by determining a sum of cross-correlations from a bin in the band to the highest bin in the band) (also referred to herein as reverse-cumulated cross-correlations). Further, for each channel, reverse-cumulated auto-correlations may be determined. For each channel, the acoustic power at a bin within the band may be evaluated as the mean (or max) of reverse-cumulated cross-correlations of all channel pairs involving the channel (where a number of the channel pairs corresponds to the number of channels−1) at the bin. The total power may be evaluated as the reverse-cumulated auto-correlation at the bin, and their ratio (e.g., a value between 0 and 1) may be an element in the matrix of the wind map. The wind map may comprehensively describe the distribution of wind power over time and frequency.

Alternatively or in addition to the first wind turbulence reduction process, a second wind turbulence reduction process may include tracking a "least windy channel" of the multichannel input. For example, a lower band (e.g., 0-500 Hz) may be used to detect the least windy channel. In some cases, an acoustic signal (e.g., a signal of interest, such as music or speech) may have approximately the same power (e.g., at lower frequencies) across different channels. A non-acoustic signal (e.g., wind turbulence noise) may vary across different channels. For each time frame, a channel with a lowest signal level in a lower frequency band may be selected as a potential (or candidate) least windy channel. The candidate least windy channel and the signal level of the candidate least windy channel may be determined using a tracking device (e.g., a finite state machine) included in the wind turbulence noise reduction engine 112. The tracking device may be configured to enable tracking of the least windy channel (e.g., in cases where selection of a channel as the least windy channel changes dynamically). The tracking device may be configured to generate a binary signal indicating the least windy channel. The tracking device may be configured to store indications of one or more other parameters, such as a level tolerance, an absolute level threshold, and a relative level threshold.

Alternatively or in addition, the second wind turbulence reduction process may include determining a ratio of acoustic to total power (e.g., 1−wind power to total power ratio at the lowest bin of the band for wind map computation). At each time frame, a channel with the highest acoustic to total power ratio may be selected as a potential least windy channel. The ratio and that of the last frame's least windy channel, as well as pre-determined parameters including ratio tolerance, absolute and relative thresholds may be provided to the tracking device to smoothly track the least windy channel. The tracking device may be configured to generate a binary signal for changing a least windy channel associated with a previous frame.

Alternatively or in addition to the first and second wind turbulence reduction processes, a third wind turbulence reduction process may include deriving a switching frequency and a switching policy for each channel. The switching frequency may be based on any of the sets of switching frequencies 206, 208 of FIG. 2. The wind turbulence noise reduction engine 112 of FIG. 1 may be configured to "smooth" wind turbulence noise (e.g., the signal components 110, 120) by reducing or limiting change of frequency from one frame to the next.

The wind turbulence noise reduction engine 112 of FIG. 1 may be configured to determine a switching policy based on the sets of switching frequencies 206, 208. To illustrate, for each channel at each time frame, the wind turbulence noise reduction engine 112 of FIG. 1 may be configured to determine, based on an amount of wind turbulence noise, whether to switch to a less windy channel (e.g., to reduce blocking of an acoustic signal, such as speech or music, by wind turbulence). One or more of an indication of a ratio of acoustic signal energy to signal energy (or lower band level) for each channel and an indication of a least windy channel may be stored at the tracking device. The tracking device may be configured to generate an output signal that indicates the switching policy. The tracking device may be configured to maintain the switching policy over time unless wind condition significantly changes (e.g., in response to different wind directions).

Alternatively or in addition to the first, second, and third wind turbulence reduction processes, a fourth wind turbulence reduction process may include cross-channel filtering and merging. To illustrate, for each non-switching channel at a frame, a spectrum of the non-switching channel may be unchanged, and for each switching channel at a frame, a spectrum of the switching channel may be merged with a spectrum of the least windy channel. Merging of switching channels may include copying, for a least windy channel, a first spectrum portion (e.g., below a transition frequency, which may be a switching frequency minus one-half of a pre-determined transition bandwidth) to a corresponding second spectrum portion of another channel (e.g., for a common frequency range). During a transition band (e.g., at boundaries of the first spectrum portion), the first spectrum portion of the least windy channel may be "faded in," and above the transition band, first spectrum portion may be unchanged. To illustrate, in some examples, the input signal 106 may correspond to a least windy channel, and first signal component 108 may replace a signal component of the second input signal 116, such as the fifth signal component 120. In this example, the sixth signal component 142 may include or may correspond to the first signal component 108, and the signal components 108, 120 may be associated with a common frequency range.

In some cases, a phase adjustment process may be performed during the fourth wind turbulence reduction process (e.g., to compensate for phase differences between channels to be merged). The phase adjustment process may be performed based on one or more of an input phase of a target channel (e.g., the magnitude of spectrum of the least windy channel) or an estimated delay (e.g., a linear delay). To estimate a delay, a cross-correlation at different time delays may be determined, such as using an inverse real Fourier transform of a cross-conjugate product of two spectra at a band of relatively low wind. To illustrate, a coefficient from one spectrum may be multiplied by the conjugate of the coefficient from the other spectrum at the same bin. A rough linear delay may be set to a delay time point (e.g., an integer number of sample points) with a highest value within a pre-determined delay range. The rough linear delay may be interpolated to derive a refined linear delay (e.g., for sub-sample delays). The refined linear delay may be smoothed and applied to the spectrum of the least windy channel as a linear phase shift (e.g., to reconstruct direction of arrival information blocked in a strong wind band), thus reconstructing a spatial image, such as directions of sound sources.

In some cases, delay estimation may not be very steady across a frame due to strong wind, noise, one or more other factors, or a combination thereof. The tracking device may be configured to generate a signal indicating whether or not to track the delay across frames using inputs including switching policies of current and previous frames, least windy channel of current and previous frames, "maximum" normalized correlation of the current and previous frames, or a combination thereof. If delay is not to be tracked, phase of the least windy channel may be unchanged, or phase of the target channel may be used. If delay is to be tracked, the wind turbulence noise reduction engine 112 may apply an auto regressive filter to smooth out noisy variations in delay.

Alternatively or in addition to the first, second, third, and fourth wind turbulence reduction processes, a fifth wind turbulence reduction process may include multi-resolution (e.g., multi-time-scale resolution) analysis of signal level variation for spectral spike detection and suppression. In an illustrative example, the fifth wind turbulence reduction process is performed by the wind spike reducer 126 of FIG. 1.

Using a first resolution (e.g., a 10 millisecond (ms) frame), high-band levels (e.g., above the switching frequency) of one or more consecutive frames may be calculated. The fifth wind turbulence reduction process may further include determining one or more ratios, such as ratio of a center frame level to a mean frame level to the left (past), a ratio of the center frame level to a mean frame level to the right (future), and ratio of the center frame level to a mean frame level. In an illustrative example, if each ratio exceeds a corresponding threshold, the center frame is determined as containing one or more spectral spikes.

If for a particular frame of a channel one or more other channels are not subject to spikes, the center frame may be replaced with a frame from the channel with a lowest ratio of the center frame level to the mean frame level. If for a particular frame each channel is subject to spikes, the center frame may be attenuated using a gain (e.g., less than one) generated based on the ratio of the center frame level to the mean frame level.

Since spectral spikes due to wind turbulence may have multiple time-scales, spike detection and suppression may be applied using several passes to each channel (e.g., using a 5 ms window, 10 ms window, and a 20 ms window). The same time scale may be used at different passes (e.g., to detect and suppress closely spaced spikes).

Alternatively or in addition to the first, second, third, fourth, and fifth wind turbulence reduction processes, a sixth wind turbulence reduction process may include multi-band multi-resolution short-time and long-time level tracking for fluctuation detection and suppression. In an illustrative example, the sixth wind turbulence reduction process is performed by the fluctuation reducer 128 of FIG. 1.

In some cases, strong short-time level fluctuation of different tempos may exist in some bands (e.g., around the switching frequencies). To detect such a fluctuation in a band, a frame-by-frame mean level of the band (also referred to as short-time level) may be determined. Mean levels may be smoothed across frames using auto regressive moving average filtering (e.g., with pre-determined parameters). The smoothed mean levels are also referred to herein as long-time level. For each frame, the short-time level is compared against the long-time level. If a short-time level is less than a long-time level, a gain of one or more may be applied to the band. If a short-time level is greater than the long-time level, a gain of one or less may be applied to the band.

The sixth wind turbulence reduction process may be applied to one or more other bands (e.g., one or more bands below 1000 Hz) at different time scales. Accordingly, fluctuation due to wind turbulence may be damped and spectral response (e.g., long term average of spectra) may remain substantially unchanged as compared to before fluctuation suppression.

Figure 4:
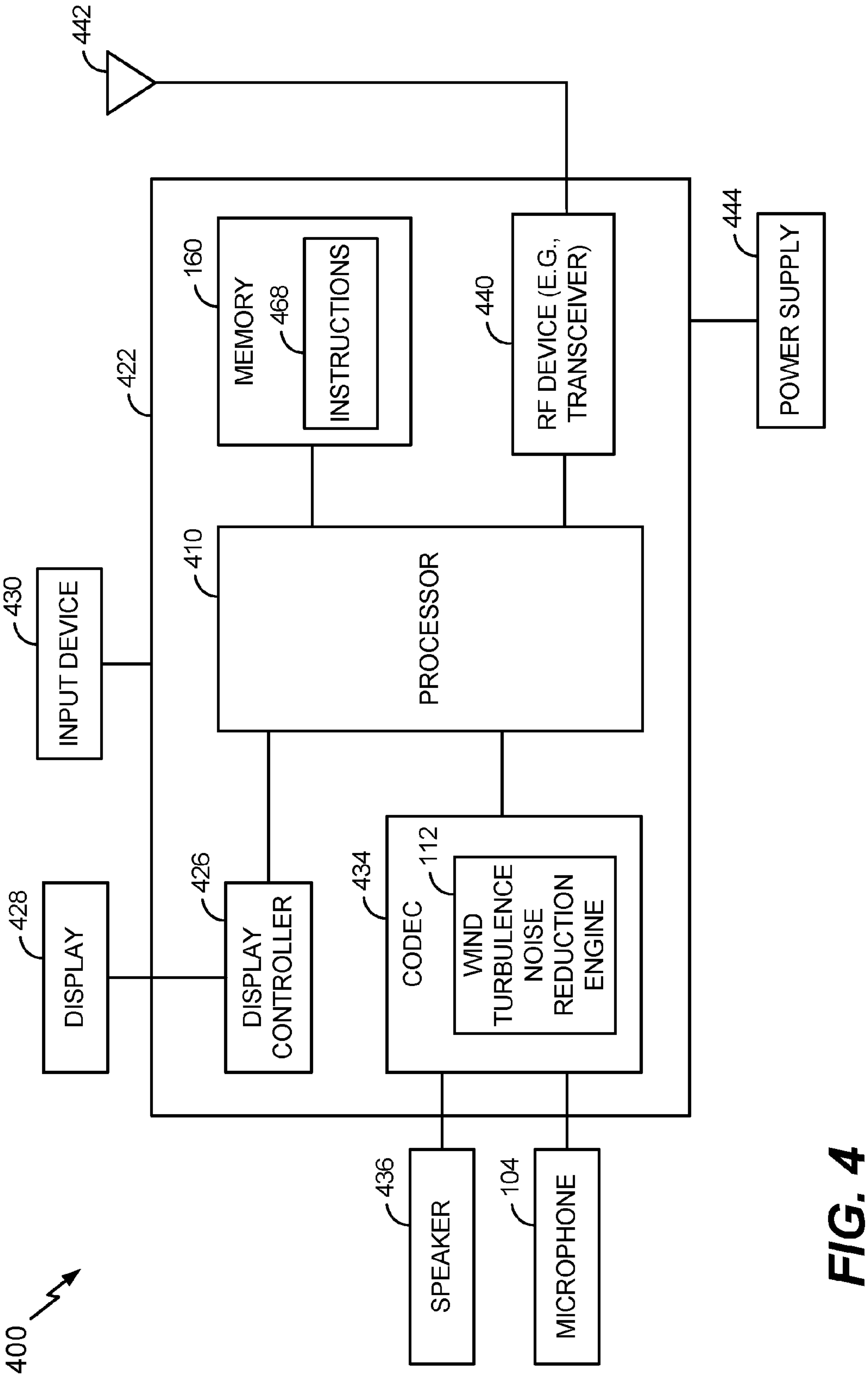
FIG. 4 is a block diagram of an illustrative example of an electronic device that includes the wind turbulence noise reduction engine of FIG. 1.

Referring to FIG. 4, a block diagram of a particular illustrative example of an electronic device is depicted and generally designated 400. The electronic device 400 may correspond to an action camera device, as an illustrative example. In other implementations, the electronic device 400 may correspond to a mobile device (e.g., a cellular phone), a computer (e.g., a server, a laptop computer, a tablet computer, or a desktop computer), an access point, a base station, a wearable electronic device (e.g., a personal camera, a head-mounted display, or a watch), a vehicle control system or console, an autonomous vehicle (e.g., a robotic car or a drone), a home appliance, a set top box, an entertainment device, a navigation device, a personal digital assistant (PDA), a television, a monitor, a tuner, a radio (e.g., a satellite radio), a music player (e.g., a digital music player or a portable music player), a video player (e.g., a digital video player, such as a digital video disc (DVD) player or a portable digital video player), a robot, a healthcare device, another electronic device, or a combination thereof.

The electronic device 400 includes a processor 410. The processor 410 may include a digital signal processor (DSP), a central processing unit (CPU), a graphics processing unit (GPU), another processing device, or a combination thereof.

The electronic device 400 may further include the memory 160. The memory 160 may be coupled to or integrated within the processor 410. The memory 160 may store instructions 468 that are executable by the processor 410. To further illustrate, the memory 160 may include random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), one or more registers, a hard disk, a removable disk, a compact disc read-only memory (CD-ROM), another storage device, or a combination thereof.

A coder/decoder (CODEC) 434 can also be coupled to the processor 410. The CODEC 434 may include the wind turbulence noise reduction engine 112. The CODEC 434 may be coupled to one or more microphones, such as the microphone 104. Alternatively or in addition, the CODEC 434 may be coupled to the second microphone 114. In some cases, the CODEC 434 may include a processor (e.g., a DSP or other processor) configured to execute the instructions 468 to perform one or more operations described herein, such as operations of the method 300 of FIG. 3. Alternatively or in addition, the processor 410 may be configured to execute the instructions 468 to perform one or more operations described herein, such as operations of the method 300 of FIG. 3.

FIG. 4 also shows a display controller 426 that is coupled to the processor 410 and to a display 428. A speaker 436 may be coupled to the CODEC 434. FIG. 8 also indicates that an antenna 442 may be coupled to a radio frequency (RF) device 440 (e.g., a transceiver).

In a particular example, the processor 410, the display controller 426, the memory 160, the CODEC 434, and the RF device 440 are included in or attached to a system-on-chip (SoC) or system-in-package (SiP) device 422. Further, an input device 430 and a power supply 444 may be coupled to the SoC or SiP device 422. Moreover, in a particular example, as illustrated in FIG. 4, the display 428, the input device 430, the speaker 436, the microphone 104, the antenna 442, and the power supply 444 are external to the SoC or SiP device 422. However, each of the display 428, the input device 430, the speaker 436, the microphone 104, the antenna 442, and the power supply 444 can be coupled to a component of the SoC or SiP device 422, such as to an interface or to a controller.

In connection with the described examples, a computer-readable medium (e.g., the memory 160) the stores instructions (e.g., the instructions 468) executable by a processor (e.g., the processor 410, or a processor of the CODEC 434) to perform operations. The operations include receiving an input signal (e.g., the input signal 106) corresponding to at least one microphone (e.g., the microphone 104) of a device. The input signal includes a first signal component (e.g., the first signal component 108) having a first amount of wind turbulence noise and a second signal component (e.g., the second signal component 110) having a second amount of wind turbulence noise that is greater than the first amount of wind turbulence noise. The operations further include generating, based on the input signal, an output signal (e.g., the output signal 130) that includes the first signal component and a third signal component (e.g., the third signal component 132) that replaces the second signal component. A first frequency response of the input signal corresponds to a second frequency response of the output signal.

In connection with the described examples, an apparatus includes means (e.g., the wind turbulence noise reduction engine 112) for receiving an input signal (e.g., the input signal 106) and for generating an output signal (e.g., the output signal 130) based on the input signal. The input signal includes a first signal component (e.g., the first signal component 108) having a first amount of wind turbulence noise and a second signal component (e.g., the second signal component 110) having a second amount of wind turbulence noise that is greater than the first amount of wind turbulence noise. The output signal includes the first signal component and a third signal component (e.g., the third signal component 132) that replaces the second signal component. A first frequency response of the input signal corresponds to a second frequency response of the output signal. The apparatus further includes means (e.g., the memory 160) for storing reference data (e.g., the reference data 162) available to the means for receiving the input signal. In an illustrative example, the means for receiving the input signal is configured to identify wind turbulence noise of the second signal component using the reference data.

Although certain examples are described with reference to the input signal 106, the first signal component 108, the second signal component 110, the output signal 130, and the third signal component 132, it should be appreciated that such examples may be applicable to one or more other features. For example, the examples may be applicable to the second input signal 116, the fourth signal component 118, the fifth signal component 120, the second output signal 140, and the sixth signal component 142.

The foregoing disclosed devices and functionalities may be designed and represented using computer files (e.g. RTL, GDSII, GERBER, etc.). The computer files may be stored on computer-readable media. Some or all such files may be provided to fabrication handlers who fabricate devices based on such files. Resulting products include wafers that are then cut into die and packaged into integrated circuits (or "chips"). The chips are then employed in electronic devices, such as the electronic device 400 of FIG. 4.

The various illustrative logical blocks, configurations, modules, circuits, and algorithm steps described in connection with the examples disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

One or more operations of a method or algorithm described herein may be embodied directly in hardware, in a software module executed by a processor, or in a combination of the two. For example, one or more operations of the method 300 of FIG. 3 may be initiated, controlled, or performed by a field-programmable gate array (FPGA) device, an application-specific integrated circuit (ASIC), a processing unit such as a central processing unit (CPU), a digital signal processor (DSP), a controller, another hardware device, a firmware device, or a combination thereof. A software module may reside in random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed examples is provided to enable a person skilled in the art to make or use the disclosed examples. Various modifications to these examples will be readily apparent to those skilled in the art, and the principles defined herein may be applied to other examples without departing from the scope of the disclosure. Thus, the present disclosure is not intended to be limited to the examples shown herein but is to be accorded the widest scope possible consistent with the principles and novel features as defined by the following claims.

What is claimed is:

1. A method of operation of a device, the method comprising:

receiving an input signal at a device, the input signal generated using at least one microphone and including a first signal component having a first amount of wind turbulence noise and a second signal component having a second amount of wind turbulence noise that is greater than the first amount of wind turbulence noise; and based on the input signal, generating an output signal at the device, the output signal including the first signal component and a third signal component that replaces the second signal component, wherein the second signal component is identified based on a first time segment of the input signal and further based on a second time segment of the input signal, the first time segment having a first duration that is different than a second duration of the second time segment, and wherein a first frequency response of the input signal corresponds to a second frequency response of the output signal.

2. The method of claim 1, further comprising reducing the second signal component in connection with a wind turbulence suppression process to generate the third signal component.

3. The method of claim 2, further comprising resynthesizing the first frequency response after reducing the second signal component to generate the second frequency response of the output signal.

4. The method of claim 1, further comprising receiving a second input signal generated using a second microphone, the input signal and the second input signal having a first spatial image.

5. The method of claim 4, further comprising generating a second output signal, wherein a second spatial image of the output signal and the second output signal corresponds to the first spatial image.

6. The method of claim 5, wherein a first phase difference between the input signal and the second input signal corresponds to a second phase difference between the output signal and the second output signal.

7. The method of claim 5, wherein a first gain difference between the input signal and the second input signal corresponds to a second gain difference between the output signal and the second output signal.

8. The method of claim 1, further comprising:

removing the second signal component of the input signal; and after removing the second signal component, temporally interpolating the input signal based on the first signal component to generate the third signal component.

9. The method of claim 1, further comprising adjusting an inter-channel phase difference between the input signal and a second input signal to generate the output signal.

10. The method of claim 1, wherein the third signal component corresponds to an attenuated version of the second signal component.

11. The method of claim 1, further comprising:

identifying wind turbulence noise of the input signal; and generating a wind map based on the wind turbulence noise.

12. The method of claim 11, wherein identifying the wind turbulence noise includes determining that a difference between the input signal and a second input signal satisfies a threshold.

13. The method of claim 11, wherein identifying the wind turbulence noise includes comparing samples of the input signal to reference data, the samples corresponding to the first time segment and the second time segment.

14. The method of claim 13, further comprising:

comparing the first time segment to a first reference of the reference data, the first reference having the first duration; and comparing the second time segment to a second reference of the reference data, the second reference having the second duration.

15. The method of claim 11, wherein the wind map indicates, for each frequency of a plurality of frequencies of the input signal and for each time interval of a plurality of time intervals, a ratio of wind turbulence energy to signal energy.

16. A device comprising:

a wind turbulence noise reduction engine configured to receive an input signal including a first signal component having a first amount of wind turbulence noise and a second signal component having a second amount of wind turbulence noise that is greater than the first amount of wind turbulence noise, to identify the second signal component based on a first time segment of the input signal and further based on a second time segment of the input signal, the first time segment having a first duration that is different than a second duration of the second time segment, and to generate an output signal based on the input signal, the output signal including the first signal component and a third signal component that replaces the second signal component, wherein a first frequency response of the input signal corresponds to a second frequency response of the output signal; and a memory coupled to the wind turbulence noise reduction engine.

17. The device of claim 16, further comprising one or more microphones configured to generate the input signal.

18. The device of claim 16, wherein the wind turbulence noise reduction engine further includes:

a wind map generator configured to receive the input signal and to generate a wind map based on the input signal; and a signal component generator configured to identify the second signal component based on the wind map.

19. The device of claim 17, further comprising a speaker configured to generate an acoustic signal based on the output signal.

20. The device of claim 17, wherein the second signal component corresponds to one or more of a wind fluctuation or a wind spike, and wherein the wind turbulence noise reduction engine includes one or more of a wind spike reducer configured to attenuate the wind fluctuation or a wind spike reducer configured to attenuate the wind spike.

21. A non-transitory computer-readable medium storing instructions executable by a processor to perform operations comprising:

receiving an input signal corresponding to at least one microphone of a device, the input signal including a first signal component having a first amount of wind turbulence noise and a second signal component having a second amount of wind turbulence noise that is greater than the first amount of wind turbulence noise; and based on the input signal, generating an output signal that includes the first signal component and a third signal component that replaces the second signal component, wherein the second signal component is identified based on a first time segment of the input signal and further based on a second time segment of the input signal, the first time segment having a first duration that is different than a second duration of the second time segment, and wherein a first frequency response of the input signal corresponds to a second frequency response of the output signal.

22. The non-transitory computer-readable medium of claim 21, the operations further comprising reducing the second signal component in connection with a wind turbulence suppression process to generate the third signal component.

23. The non-transitory computer-readable medium of claim 22, the operations further comprising resynthesizing the first frequency response after reducing the second signal component to generate the second frequency response of the output signal.

24. The non-transitory computer-readable medium of claim 21, the operations further comprising receiving a second input signal corresponding to a second microphone of the device, the input signal and the second input signal having a first spatial image.

25. The non-transitory computer-readable medium of claim 24, the operations further comprising generating a second output signal, wherein a second spatial image of the output signal and the second output signal corresponds to the first spatial image.

26. The non-transitory computer-readable medium of claim 25, wherein a first phase difference between the input signal and the second input signal corresponds to a second phase difference between the output signal and the second output signal.

27. The non-transitory computer-readable medium of claim 25, wherein a first gain difference between the input signal and the second input signal corresponds to a second gain difference between the output signal and the second output signal.

28. The non-transitory computer-readable medium of claim 21, the operations further comprising:

removing the second signal component of the input signal; and after removing the second signal component, temporally interpolating the input signal based on the first signal component to generate the third signal component.

29. An apparatus comprising:

means for receiving an input signal including a first signal component having a first amount of wind turbulence noise and a second signal component having a second amount of wind turbulence noise that is greater than the first amount of wind turbulence noise, for identifying the second signal component based on a first time segment of the input signal and further based on a second time segment of the input signal, the first time segment having a first duration that is different than a second duration of the second time segment, and for generating an output signal based on the input signal, the output signal including the first signal component and a third signal component that replaces the second signal component, wherein a first frequency response of the input signal corresponds to a second frequency response of the output signal; and means for storing reference data available to the means for receiving the input signal.

30. The apparatus of claim 29, wherein the means for receiving the input signal is configured to detect wind turbulence noise of the second signal component using the reference data.

* * * * *